United States Patent [19]

Santarossa et al.

[11] Patent Number: 5,131,432
[45] Date of Patent: Jul. 21, 1992

[54] DISHWASHER WITH DISCHARGE PUMP AND NONRETURN VALVE

[75] Inventors: Gianni Santarossa; Elvio Tonus, both of Pordenone, Italy

[73] Assignee: Zanussi Elettrodomestici S.P.A., Pordenone, Italy

[21] Appl. No.: 806,678

[22] Filed: Dec. 13, 1991

[30] Foreign Application Priority Data

Dec. 17, 1990 [IT] Italy .......................... 34094/90[U]

[51] Int. Cl.⁵ .......................................... F16K 15/16
[52] U.S. Cl. ................................. 137/855; 134/183; 134/186; 137/527.2; 137/584
[58] Field of Search ............... 137/527.2, 855–858, 137/584; 68/208; 134/183, 186

[56] References Cited

U.S. PATENT DOCUMENTS 2,867,213  1/1959  Thomas ..................... 137/855 X
3,292,658  12/1966  Scaramucci ............... 137/527.2 X
4,141,381  2/1979  Eminger ..................... 137/527.2
4,467,627  8/1984  Platt .............................. 68/208

Primary Examiner—Robert G. Nilson
Attorney, Agent, or Firm—Pearne, Gordon, McCoy & Granger

[57] ABSTRACT

A dishwasher with a wash tub (3) connected on the bottom to a collection well (4) into which extends the outlet duct (8) of a discharge pump (6) fitted with a nonreturn valve (11) accessible from the inside of the wash tub. The valve consists of a box-like housing (12) made in one piece with the outlet duct (8) which, in turn, is made in one piece with the well (4). The valve (11) has a flat flexible-membrane plug (18) with a tail (19) hooked to a peg (21) made in one piece with the box-like body (12). A protrusion (22) of the cover (13) for the box-like body (12) is in contact with the peg (21) to block the membrane (18) in position.

3 Claims, 1 Drawing Sheet

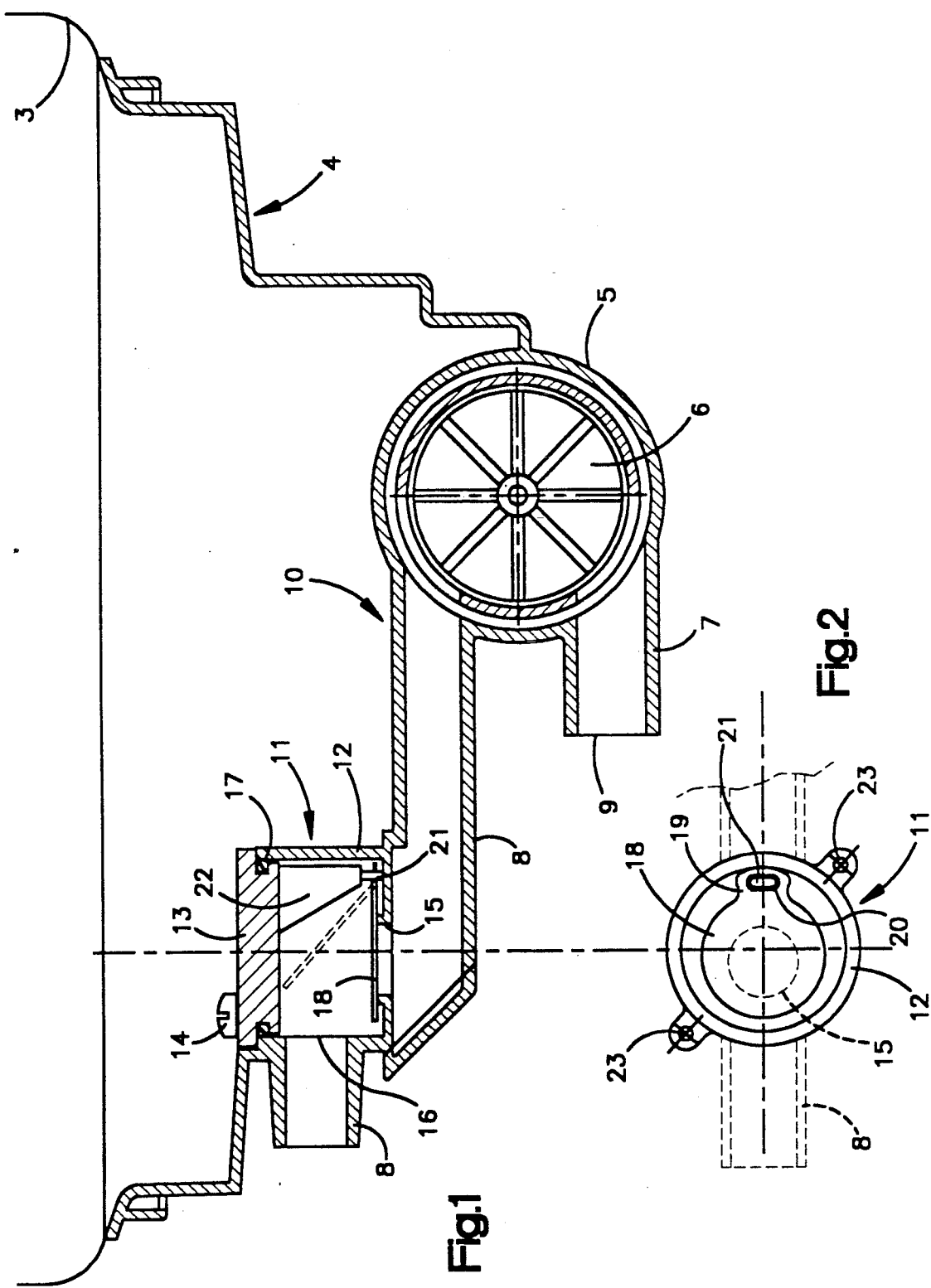

DISHWASHER WITH DISCHARGE PUMP AND NONRETURN VALVE

BACKGROUND OF THE INVENTION

1. Field of the Invention

The present invention generally relates to a dishwasher with a hydraulic discharge circuit consisting of a discharge pump with a nonreturn valve that stops the backflow of the dirty drainage water into the machine.

2. Description of Related Art

A dishwasher of this type is described, for example, in DE-C2-3 443 166, which calls for the nonreturn valve to be placed in the force duct of the discharge pump. The force duct extends into the machines collection well so that the nonreturn valve is accessible from the inside of the wash tub. The nonreturn valve consists of a spherical plug placed on a bell seat inserted into a transparent housing that allows the inspection of the valve. In particular, the housing is made in two complementary parts joined together to form a tight seal, for example by gluing an upper of the housing houses the valve and a lower portion, forming part of the discharge pumps housing, is form-coupled to the collection well.

For any cleaning or maintenance operations, the nonreturn valve can be removed together with the whole transparent housing. However, the transparent housing cannot be easily taken apart because the two housing portions which constitute the housing have been glued together. In any case, even if the two portions of the housing become separated from each other, it is relatively hard to gain access to the valves plug and its bell seat which, as already stated, are inserted into the upper part of the transparent housing. Finally, a nonreturn valve of the type mentioned proves to be undesirably complex from the viewpoint of construction and is hard to access for maintenance.

SUMMARY OF THE INVENTION

Therefore, an object of present invention is to provide a dishwasher with a discharge pump equipped with a nonreturn valve wherein the nonreturn valve is formed in one piece with the outlet duct which, in turn, is made in one piece with the well. The nonreturn valve further having an inlet opening and an outlet opening which is in communication with the outlet duct, as well as a removable closing cover having a particularly simple and economic structure, which also makes it easily accessible from inside the machine's wash tub.

According to the invention, that aim is attained in a dishwasher with discharge pump and nonreturn valve.

BRIEF DESCRIPTION OF THE DRAWINGS

The characteristics and advantages of the invention will be more evident from the following description, intended only as an example and not to be limitative, with reference to the attached drawings, in which:

FIG. 1 shows a partial cross section of a preferred form of construction of a dishwater according to the invention; and FIG. 2 shows a view from above of the nonreturn valve, of the dishwasher of FIG. 1, whose closing cover has been removed.

With specific reference in to FIG. 1, the dishwasher consists mainly of a wash tub (3) (shown only partially), which connects on the bottom with a molded water collection well (4). The well (4) should preferably be in one piece out of plastic, and have a space (5) suitable to house a discharge pump (6). The well (4) also includes, in one piece. an hydraulic inlet duct (7) and an hydraulic outlet duct (8), which are respectively connected to the pumps (6) intake and force ducts. The end of the inlet duct (7), which in FIG. 1 is shown free and indicated by 9, is to be connected in the usual manner to the bottom (10) of the collection well. The outlet duct (8) extends at least in part across the collection well (4), of which is constitutes part of the bottom, and is fitted with a nonreturn valve (11) placed in the well itself in such a way that it proves accessible from inside the wash tub (3). In addition, the outlet duct (8) must be understood to be connected to a known discharge which has not been shown for the sake of simplicity.

The nonreturn valve (11) is of the type, familiar in its own right, having a flexible membrane, e.g. rubber, as its plug. With reference to FIG. 2 as well, the valve (11) has a box-like body (12) made in one piece with the well (4) or more precisely, with the upper part of the outlet duct (8). The box-like body is closed at the top by a cover (13) which is fixed to the body (12), using an ordinary circular gasket (17) to effect a seal, for example, by two bolts (14) or like, inserted into threaded lugs (23) on the body (12).

The box-like body (12) also has an inlet opening (15) and an outlet opening (16) made, respectively, on its bottom wall and on its substantially vertical side wall, by means of which it is in communication with the duct (8). The flexible membrane (18) is housed within the box-like body (12) in such a way as normally to close the inlet (15). Specifically the membrane (18) is made with a tail (19) having a hole (20) by means of which it fits onto a corresponding peg (21) extending upward from the bottom of the box-like body (12), with which it is made in one piece. A protrusion (22) made in one piece with the cover (13) extends downward, and is substantially in contact with the peg (21), to block the membrane (12) in position even when it flexes, as shown by the dotted line in FIG. 1. This allows the passage of water to the drain, through the duct (8), when the pump (6) is operating. For this purpose, the free end of the protrusion (22) opportunely has a greater cross section than the hole (20) in the membrane.

The simple construction of the nonreturn valve (11) of the present invention appears evident. It consists of a limited number of parts whose form and coupling are elementary. Similarly, it appears evident that in the case of maintenance and/or cleaning, the discharge valve can be quickly and completely disassembled, working from the inside of the wash tub (3), by simply loosening the bolts (14) to remove the cover (13) and pulling the membrane (18) from the peg (21).

Obviously the dishwasher described can undergo numerous modifications falling within the scope of the invention as defined in the attached claims.

We claim:

1. A dishwasher with a wash tub connected at a bottom thereof with a water collection well in which an outlet duct extends at least partially from a discharge pump, said outlet duct being provided with a nonreturn valve accessible from inside the wash tub, wherein said nonreturn valve (11) comprises a box-like body (12) made in one piece with said outlet duct (8), which in turn is made in one piece with said well (4), the box-like body (12) having an inlet opening (15) and an outlet opening (16) communicating with said outlet duct (8), as well as a removable closing cover (13) mounted with bolts (14), or the like.

2. A dishwasher according to claim 1, wherein the nonreturn valve includes a flexible membrane-type plug, wherein said membrane-type plug (18) is arranged in said box-like body (12) to normally close said inlet opening (15) and is formed with a tail (19) having a hole (20) through which it is hooked onto a peg (21) made in one piece with said box-like body (12).

3. A dishwasher according to claim 2, wherein said closing cover (13) is shaped with a protrusion (22) extending into said box-like body (12), said protrusion (22) having an end portion whose cross section is greater than said hole (20) and substantially in contact with said peg (21) to block said membrane-type plug (18) in position.

* * * * *

UNITED STATES PATENT AND TRADEMARK OFFICE
CERTIFICATE OF CORRECTION

PATENT NO. : 5,131,432

DATED : July 21, 1992

INVENTOR(S) : Gianni Santarossa, et al.

It is certified that error appears in the above-identified patent and that said Letters Patent is hereby corrected as shown below:

Column 1, line 8, after "circuit" insert --and, more particularly, to a dishwasher having a hydraulic discharge circuit--.

Column 1, line 22, "gluing an" should be --gluing. An--.

Column 1, line 22, after "upper" insert --portion--.

Column 1, line 42-47 "wherein the nonreturn valve is formed in one piece with the outlet duct which, in turn, is made in one piece with the well. The nonreturn valve further having an inlet opening and an outlet opening which is in communication with the outlet duct, as well as a removable closing cover" should be moved to line 51 following --valve--.

Column 1, line 64, delete "in".

Column 1, line 67, after "be" insert --made--.

Column 2, line 6, "is" should be --must be understood to be--.

Column 2, line 8, "is" should be --it--.

Column 2, line 12, "must be understood to be" should be --is--.

Column 2, line 13, after "discharge" insert --drain--.

Column 2, line 19, after "or" insert --,--.

Column 2, line 24, after "or" insert --the--.

UNITED STATES PATENT AND TRADEMARK OFFICE
CERTIFICATE OF CORRECTION

Page 2 of 2

PATENT NO. : 5,131,432
DATED : July 21, 1992
INVENTOR(S) : Gianni Santarossa, et. al.

It is certified that error appears in the above-indentified patent and that said Letters Patent is hereby corrected as shown below:

Column 2, line 32, after "Specifically" insert --,--.

Signed and Sealed this

Twenty-eighth Day of September, 1993

Attest:

BRUCE LEHMAN

Attesting Officer       Commissioner of Patents and Trademarks